United States Patent
Sakurai et al.

(10) Patent No.: US 7,791,315 B2
(45) Date of Patent: Sep. 7, 2010

(54) BATTERY STATE MONITORING CIRCUIT AND BATTERY DEVICE

(75) Inventors: Atsushi Sakurai, Chiba (JP); Kazuaki Sano, Chiba (JP); Toshiyuki Koike, Chiba (JP)

(73) Assignee: Seiko Instruments Inc., (JP)

( * ) Notice: Subject to any disclaimer, the term of this patent is extended or adjusted under 35 U.S.C. 154(b) by 398 days.

(21) Appl. No.: 12/005,000

(22) Filed: Dec. 20, 2007

(65) Prior Publication Data
US 2008/0203971 A1    Aug. 28, 2008

(30) Foreign Application Priority Data
Dec. 26, 2006   (JP)   .............................. 2006-349278

(51) Int. Cl.
*H02J 7/00* (2006.01)
(52) U.S. Cl. ...................... 320/134; 320/132
(58) Field of Classification Search .................. 320/132, 320/134, 135
See application file for complete search history.

(56) References Cited

U.S. PATENT DOCUMENTS 6,605,925 B2 *   8/2003   Tange et al. .................. 320/134

* cited by examiner

*Primary Examiner*—Edward Tso
*Assistant Examiner*—Richard V Muralidar
(74) *Attorney, Agent, or Firm*—Adams & Wilks

(57) ABSTRACT

An object of the present invention is to provide a battery state monitoring circuit and a battery device which are capable of normally operating when a charger (301) is connected to an opposite polarity in error, and then correctly connected. In the case where the charger (301) is connected to the opposite polarity in error and then correctly connected, a logic circuit (305) does not output a power-down signal that powers down the respective circuits to the respective circuits by the aid of a power-down preventing circuit (110). As a result, the battery device normally operates without falling into the power-down state.

4 Claims, 1 Drawing Sheet

BATTERY STATE MONITORING CIRCUIT AND BATTERY DEVICE

BACKGROUND OF THE INVENTION

1. Field of the Invention

The present invention relates to a battery state monitoring circuit that monitors a state of a battery in a battery device that is connected with a charger or a load, and a battery device that is equipped with the circuit.

2. Description of the Related Art

As a conventional battery device, there has been known a battery device shown in FIG. 2. FIG. 2 shows a conventional battery state monitoring circuit and a circuit block of the battery device.

A battery state monitoring circuit 202 includes an over-charge detecting circuit 108, an over-discharge detecting circuit 107, an over-current detecting circuit 108, and a logic circuit 305.

In the battery state monitoring circuit 202, when a given condition is satisfied, the logic circuit 305 outputs a high signal in order to turn on an FET 304 and an FET 303 within a switch circuit 203 (this state is called "normal state").

Also, when a charger 301 is connected between an external terminal (+V0) 204 and an external terminal (−V0) 205, charging is started, and a voltage across a battery 201 exceeds a chargeable upper limit voltage, an over-charge detecting circuit 106 outputs a detection signal, and the logic circuit 305 outputs a low signal (charge inhibition signal) in order to turn off the FET 304 within the switch circuit 203 (this state is called "over-charge state").

Further, when a load 302 is connected between the external terminal 204 and the external terminal 205, discharging is started, and the voltage across the battery 201 falls below a dischargeable lower limit voltage, an over-discharge detecting circuit 107 outputs a detection signal, and the logic circuit 305 outputs a low signal (discharge inhibition signal) in order to turn off the FET 303 within the switch circuit 203 (this state is called "over-discharge state").

In the over-discharge state, because the switch circuit 203 turns off to stop the discharge current, the external terminal 205 is isolated from the power supply which is supplied from the battery 201, and pulled up to the load 302. The battery state monitoring circuit 202 detects that the external terminal 205 has been pulled up, and outputs a power-down signal that powers down the respective circuits to the respective circuits, to thereby suppress the current consumption of the battery-state monitoring circuit 202 per se to a small value (this state is called "power-down state").

Also, when the load 302 is connected between the external terminal 204 and the external terminal 205, discharging is started, and a discharge current that flows in the switch circuit 203 increases, and a voltage at the external terminal 205 becomes equal to or higher than a given voltage, the over-current detecting circuit 108 outputs a detection signal, and the logic circuit 305 outputs a discharge inhibition signal in order to turn off the FET 303 within the switch circuit 203 (this state is called "over-current state").

However, in the conventional battery state monitoring circuit 202 and the conventional battery device, in the case where the battery state monitoring circuit 202 is formed of an n-type substrate, voltage of the voltage detection terminal that monitors the positive voltage of the battery 201 becomes normally a substrate voltage, and respective voltages at the voltage detection terminal that monitors a negative voltage of the battery 201 and the current detection terminal that monitors the current of the battery 201 become a p-well voltage. In this case, when the charger 301 is connected to an opposite polarity in error, the voltage at the current detection terminal is higher than the voltage at the voltage detection terminal that monitors the positive voltage of the battery 201, there is a case in which the p-n junction within the semiconductor integrated circuit is in a forward direction, and the parasitic transistor is turned on to make a current flow therein. As a result, the circuit operation becomes unstable and a latch circuit within the logic circuit 305 is set in error, which may cause a power-down state. Thereafter, even if the charger 301 is correctly connected, the power-down state continues, and the battery device may not operate normally.

SUMMARY OF THE INVENTION

The present invention has been made in view of the above circumstances, and therefore an object of the present invention is to provide a battery state monitoring circuit and a battery device which are capable of normally operating when a charger is connected to an opposite polarity in error and then the correctly connected.

In order to solve the above problems, the present invention provides a battery state monitoring circuit that monitors a state of a battery of a battery device that is connected with a charger or a load, including: an over-charge detecting circuit that detects an over-charge state of the battery and outputs a detection signal indicating that the over-charge state has been detected to a logic circuit; an over-discharge detecting circuit that detects an over-discharge state of the battery and outputs a detection signal indicating that the over-discharge state has been detected to the logic circuit; an over-current detecting circuit that detects an over-current state of the battery and outputs a detection signal indicating that the over-current state has been detected to the logic circuit; the logic circuit that operates so as to block a charge route which extends from the charger to the battery on the basis of the detection signal sent from the over-charge detecting circuit, operates so as to block a discharge route which extends from the battery to the load on the basis of the detection signal sent from the over-discharge detecting circuit, operates so as to block a current route which extends from the battery to the charger or the load on the basis of the detection signal sent from the over-current detecting circuit, and outputs a power-down signal that powers down the respective circuits to the respective circuits in the over-discharge state; and a power-down preventing circuit that outputs a power-down prevention signal that prevents the respective circuits from being powered down to the logic circuit when a voltage at the current detection terminal that is disposed in the current route is lower than a given voltage.

Further, the present invention provides a battery device that is connected with a charger or a load, including: the battery state monitoring circuit; the battery; and a switch that is disposed in the current route and can block the current route by being subjected to on/off control.

According to the battery state monitoring circuit and the batter device of the present invention, in the case where the charger is connected to the opposite polarity in error and then correctly connected, the logic circuit does not output the power-down signal that powers down the respective circuits to the respective circuits by the aid of the power-down preventing circuit. As a result, the battery device normally operates without falling into the power-down state.

DETAILED DESCRIPTION OF THE PREFERRED EMBODIMENTS

Hereinafter, a description will be given of an embodiment of the present invention with reference to the accompanying drawings.

Figure 1:
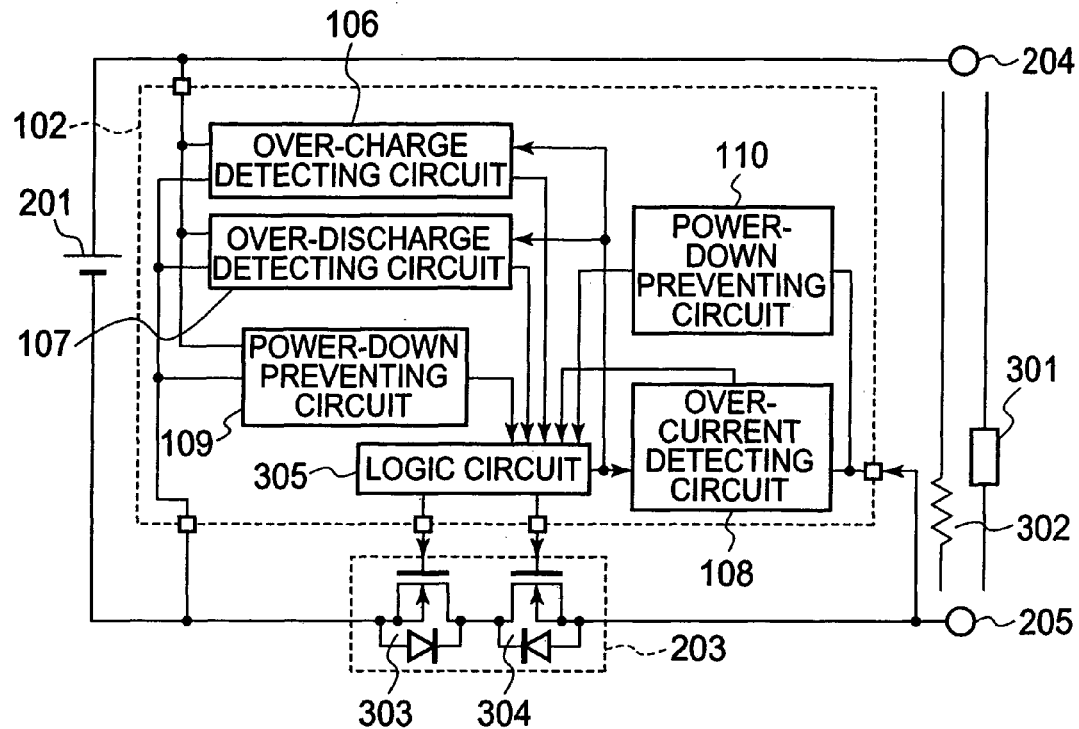
FIG. 1 is a circuit block diagram showing a battery device.
Figure 2:
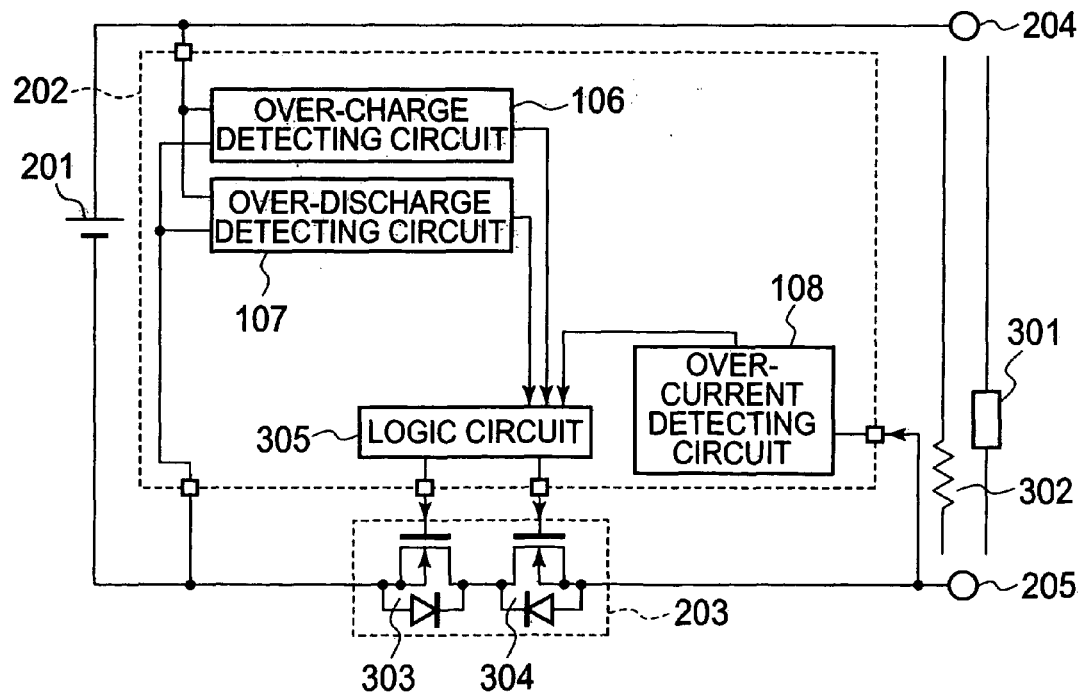
FIG. 2 is a circuit block diagram showing a conventional battery device.

FIG. 1 is a circuit block diagram showing a battery device.

A battery state monitoring circuit 102 includes an over-charge detecting circuit 106, an over-discharge detecting circuit 107, an over-current detecting circuit 108, a second power-down preventing circuit 109, a first power-down preventing circuit 110, and a logic circuit 305.

The battery state monitoring circuit 102 has a voltage detecting terminal that monitors a positive voltage or a negative voltage of the battery 201 and that is connected to a chargeable or dischargeable battery 201. The battery 201 operates as a power supply for the battery 201.

In the battery state monitoring circuit 102, in the case where a voltage across the battery 201 is lower than a chargeable upper limit voltage and equal to or higher than a dischargeable lower limit voltage, and a current that flows in a switch circuit 203 that is current adjusting means for adjusting the charging current and the discharging current of the battery 201 is lower than a given current, the logic circuit 305 outputs a high signal in order to turn on an FET 304 and an FET 303 within the switch circuit 203 (this state is called "normal state").

Also, when a charger 301 that charges the battery 201 is connected between an external terminal (+V0) 204 and an external terminal (−V0) 205, charging is started, and a voltage across the battery 201 exceeds the chargeable upper limit voltage, the over-charge detecting circuit 106 outputs a detection signal indicating that the over-charge has been detected to the logic circuit 305. The logic circuit 305 operates so as to block a charge route that extends from the charger 301 to the battery 201 on the basis of a detection signal sent from the over-charge detecting circuit 106 and then outputs a low signal (charge inhibition signal) in order to turn off the FET 304 within the switch circuit 203 (this state is called "over-charge state").

Further, when a load 302 that is driven by the battery 201 is connected between the external terminal 204 and the external terminal 205, discharging is started, and the voltage across the battery 201 falls below a dischargeable lower limit voltage, the voltage at the voltage detection terminal that monitors the positive voltage of the battery 201 becomes lower than a given voltage. Then, the over-discharge detecting circuit 107 outputs a detection signal indicating that the over-discharge has been detected to the logic circuit 305. The logic circuit 305 operates so as to block the discharge route that extends from the battery 201 to the load 302 on the basis of a detection signal sent from the over-discharge detecting circuit 107 and then outputs a low signal (discharge inhibition signal) in order to turn off the FET 303 within the switch circuit 203 (this state is called "over-discharge state").

In the over-discharge state, because the switch circuit 203 turns off to stop the discharge current, the external terminal 205 is isolated from the power supply which is supplied from the battery 201, and pulled up to the load 302. The voltage at the external terminal 205 becomes a voltage at the external terminal 204. The battery state monitoring circuit 102 outputs a detection signal indicative of the over-discharge. Also, the battery state monitoring circuit 102 detects that a voltage at the external terminal 205 has become higher than a given power-down voltage by pulling up the external terminal 205 that is a current detection terminal that monitors a voltage that is developed by the discharge current or the charge current. Then, the logic circuit 305 outputs a power-down signal that powers down the respective circuits to the respective circuits, and suppresses the current consumption of the battery state monitoring circuit 102 to a small value (this state is called "power-down state"). When the charger 301 is connected between the external terminal 204 and the external terminal 205, charging is started, and a voltage at the external terminal 205 becomes lower than the power-down voltage, the power-down state is cancelled.

Also, when the load 302 is connected between the external terminal 204 and the external terminal 205, discharging is started, a current that flows in the switch circuit 203 having a given on-resistance increases, and a voltage at the external terminal 205 becomes equal to or higher than a given voltage (a current that flows in the switch circuit 203 becomes equal to or higher than a given current), the over-current detecting circuit 108 outputs a detection signal to the logic circuit 305. The logic circuit 305 operates so as to block the current route between the battery 201 and the charger 301 or the load 302 on the basis of the detection signal sent from the over-current detecting circuit 108 and then outputs a discharge inhibition signal in order to turn off the FET 303 within the switch circuit 203 (this state is called "over-current state").

The second power-down preventing circuit 109 monitors the supply voltage of the battery state monitoring circuit 102. The second power-down preventing circuit 109 outputs a detection signal for a given period of time when detecting a transitional voltage rising at the time of turning on a power supply. The logic circuit 305 allows the discharge on the basis of the detection signal, and disables the discharge inhibition signal to be output for a given period of time.

The first power-down preventing circuit 110 monitors the external terminal 205.

In this case, it is assumed that the charger 301 is connected to the opposite polarity in error, and then correctly connected. When the voltage at the current detection terminal that is disposed in the current route becomes lower than a given voltage (a voltage resulting from adding, for example, 0.6 V to the positive voltage of the battery 201), the first power-down preventing circuit 110 outputs a power-down prevention signal that prevents the power-down of the respective circuits to the logic circuit 305 for a given period of time. In this case, the logic circuit 305 is designed so as not to output the power-down signal to the respective circuits for a given period of time, so the battery device is not in the power-down state for a given period of time.

With the above configuration, in the case where the charger 301 is connected to the opposite polarity in error and then correctly connected, the logic circuit 305 does not output the power-down signal to the respective circuits for a given period of time by the aid of the first power-down preventing circuit 110. As a result, the battery device normally operates without falling into the power-down state.

When outputting a signal to the switch circuit 203, the logic circuit 305 is capable of preventing malfunction which is temporarily caused by noises by provision of a delay time. Also, the over-charge detecting circuit 106, the over-discharge detecting circuit 107, and the over-current detecting circuit 108 have hysteresis voltage as required between the detection voltage when the detection signal is detected and the cancel voltage when the detection signal is cancelled, respectively, thereby making it possible to prevent the malfunction.

What is claimed is:

1. A battery state monitoring circuit, comprising:
    an over-charge detecting circuit that monitors a voltage between both ends of a battery to detect an over-charge state;
    an over-discharge detecting circuit that monitors a voltage between the both ends of the battery to detect an over-discharge state;
    an over-current detecting circuit that monitors a voltage at an over-current detection terminal to which a voltage between an external terminal and a switch circuit is input to detect an over-current state;
    a logic circuit that controls charge and discharge of the battery on the basis of a detection signal sent from any one of the over-charge detecting circuit, the over-discharge detecting circuit, and the over-current detecting circuit, and outputs a power-down signal to the over-charge detecting circuit, the over-discharge detecting circuit, and the over-current detecting circuit that powers down the over-charge detecting circuit, the over-discharge detecting circuit, and the over-current detecting circuit in the over-discharge state to the over-charge detecting circuit, the over-discharge detecting circuit, and the over-current detecting circuit; and
    a power-down preventing circuit that outputs a power-down prevention signal that prevents the over-charge detecting circuit, the over-discharge detecting circuit, and the over-current detecting circuit from being powered down to the logic circuit when a voltage at the over-current detection terminal is lower than a given voltage.

2. A battery state monitoring circuit according to claim 1, further comprising a second power-down preventing circuit, the second power-down preventing circuit outputting a power-down prevention signal that prevents the over-charge detecting circuit, the over-discharge detecting circuit, and the over-current detecting circuit from being powered down to the logic circuit when monitoring the voltage across the battery, detecting a transitional voltage rising at a time of turning on a power supply, and outputting the detection signal for a given period of time.

3. A battery device, comprising:
    a battery and a switch circuit which are connected in series with an external terminal to which one of a charger and a load is connected; and
    a battery state monitoring circuit according to claim 1, which monitors a voltage across the battery, controls the switch circuit, and controls charge and discharge of the battery.

4. A battery device according to claim 3, further comprising a second power-down preventing circuit, the second power-down preventing circuit outputting a power-down prevention signal that prevents the detecting circuits from being powered down to the logic circuit when monitoring a voltage across the battery, detecting a transitional voltage rising at a time of turning on a power supply, and outputting a detection signal for a given period of time.

* * * * *